(12) United States Patent  (10) Patent No.: US 7,808,400 B2
McCollough  (45) Date of Patent: Oct. 5, 2010

(54) ELECTRICAL CIRCUIT MONITORING DEVICE

(75) Inventor: Norman D. McCollough, Sharon, NH (US)

(73) Assignee: Marmon Utility LLC, Milford, NH (US)

( * ) Notice: Subject to any disclaimer, the term of this patent is extended or adjusted under 35 U.S.C. 154(b) by 468 days.

(21) Appl. No.: 11/844,785

(22) Filed: Aug. 24, 2007

(65) Prior Publication Data

US 2008/0036620 A1 Feb. 14, 2008

Related U.S. Application Data

(62) Division of application No. 11/173,294, filed on Jun. 30, 2005, now Pat. No. 7,295,133.

(60) Provisional application No. 60/640,280, filed on Dec. 30, 2004.

(51) Int. Cl.
*H04Q 9/00* (2006.01)
(52) U.S. Cl. .................. 340/870.07; 324/126; 324/127; 700/292; 700/286; 702/62
(58) Field of Classification Search ............ 340/870.02, 340/572.1, 539.1, 539.22, 660, 10.1, 10.4, 340/870.07; 700/292, 286, 293; 702/62; 324/870.07
See application file for complete search history.

(56) References Cited

U.S. PATENT DOCUMENTS

| | | | |
|---|---|---|---|
| 3,747,104 A * | 7/1973 | Pansini | 342/457 |
| 6,212,049 B1 * | 4/2001 | Spencer et al. | 361/64 |
| 6,847,300 B2 * | 1/2005 | Yee et al. | 340/584 |
| 7,006,010 B2 * | 2/2006 | Thomas et al. | 340/870.07 |
| 7,126,493 B2 * | 10/2006 | Junker et al. | 340/870.02 |
| 7,181,164 B2 * | 2/2007 | Lee et al. | 455/41.2 |
| 7,187,275 B2 * | 3/2007 | McCollough, Jr. | 340/538 |
| 7,295,133 B1 * | 11/2007 | McCollough, Jr. | 340/870.07 |
| 2003/0025612 A1 * | 2/2003 | Holmes et al. | 340/870.02 |
| 2008/0122642 A1 * | 5/2008 | Radtke et al. | 340/660 |
| 2009/0002164 A1 * | 1/2009 | Brillhart et al. | 340/572.1 |

* cited by examiner

*Primary Examiner*—Albert K Wong
(74) *Attorney, Agent, or Firm*—Jennifer E. Lacroix, Esq.; DLA Piper US LLP

(57) ABSTRACT

The present invention is directed to a method of (1) providing continuous monitoring of various operating and environmental characteristics using RFID technology or similar wireless technology and (2) capturing data on historical events that have occurred on the circuits used for the transmission and distribution of electric power. The invention has the additional capability to communicate the information to operators at the site, in remote locations, or to other equipment (peer to peer). The invention provides a low cost method and apparatus to monitor and store operating characteristics and events on the electric power distribution circuit. The information can be used to reduce the duration of outages, for improving system reliability, to study the impact on the power grid of various environmental factors, to enhance the ability to react to operating conditions such as overloads, etc.

9 Claims, 3 Drawing Sheets

ELECTRICAL CIRCUIT MONITORING DEVICE

RELATED APPLICATIONS

This application is a divisional of U.S. application Ser. No. 11/173,294, filed Jun. 30, 2005 now U.S. Pat. No. 7,295,133 that claims priority from U.S. Provisional Patent Application No. 60/640,280, filed Dec. 30, 2004.

BACKGROUND OF THE INVENTION

1. Field of Invention

This invention finds use in the field of the transmission and distribution of electric power. In particular, this invention relates to the application of RFID or similar wireless technology to monitor operating characteristics and/or capture historical parametric data about events that have occurred on the power circuit.

2. Background

Systems have been developed and are currently in use to indicate the operating characteristics of a power distribution circuit. Examples and some of their limitations include:

Voltmeters and clamp on ammeters used by field crews to measure voltage and current. These devices are usually used in troubleshooting and are not designed for continuous real time monitoring of operating characteristics. This equipment also requires that an employee bring the device to the site and connect it to the circuit in order to capture the information.

Faulted circuit indicators have also found wide application to identify if a fault has occurred on the system. These devices are left on the circuit but usually provide only a yes or no identification of a faulted circuit event. Parameters such as time of occurrence, fault direction, fault magnitude, etc are not available. In addition, many of these devices are battery operated and, as such, require periodic maintenance or have a shortened useful lifetime after which they are replaced.

System Control & Data Acquisition (SCADA) Systems utilize a personal computer (PC) or a mainframe computer to monitor characteristics in real time. SCADA systems have the capability to perform many of the improvements captured with this invention. They are however quite expensive per monitored point and, because of this currently find limited use only in the most critical portions of the power distribution circuit such as substations. In addition, these types of systems require that ancillary, expensive data acquisition equipment such as a current transformers, voltage transducers, and phase angle transducers be hard wired into the circuit in order to capture information.

Additionally, systems employing the technology can allow autonomous control operation of certain switching and switch closing/opening functions in a distributed fashion rather than the centralized fashion of present SCADA systems.

SUMMARY OF INVENTION

The present invention is directed to a new class of devices that rely on RFID or similar wireless technology in a small relatively inexpensive package to provide the ability to:

(1) Continuously monitor a wide array of operating characteristics on the electric power transmission or distribution circuit in real time.

(2) Capture specific characteristics of an event on the circuit and store the data for later retrieval.

(3) Communicate its "knowledge" to an individual on the ground for data storage and later retrieval or to someone at a remote location.

(4) Change the parameters being monitored without having to rewire, reconfigure, or add additional measurement devices to the power distribution circuit.

(5) Operate on the system without the need for a battery and be installed independently or, with minor modification, in equipment currently in use on the power circuit. Examples where the invention may be added to a device to provide monitoring and data collection activities include bushings, insulators, elbow connectors, splices, transformers, switches, etc.

BRIEF DESCRIPTION OF THE DRAWINGS

Specific embodiments of the invention have been chosen for purposes of illustration and description, and are shown in the accompanying drawing, forming a part of the specification wherein.

DESCRIPTION OF PREFERRED EMBODIMENTS

Figure 1:
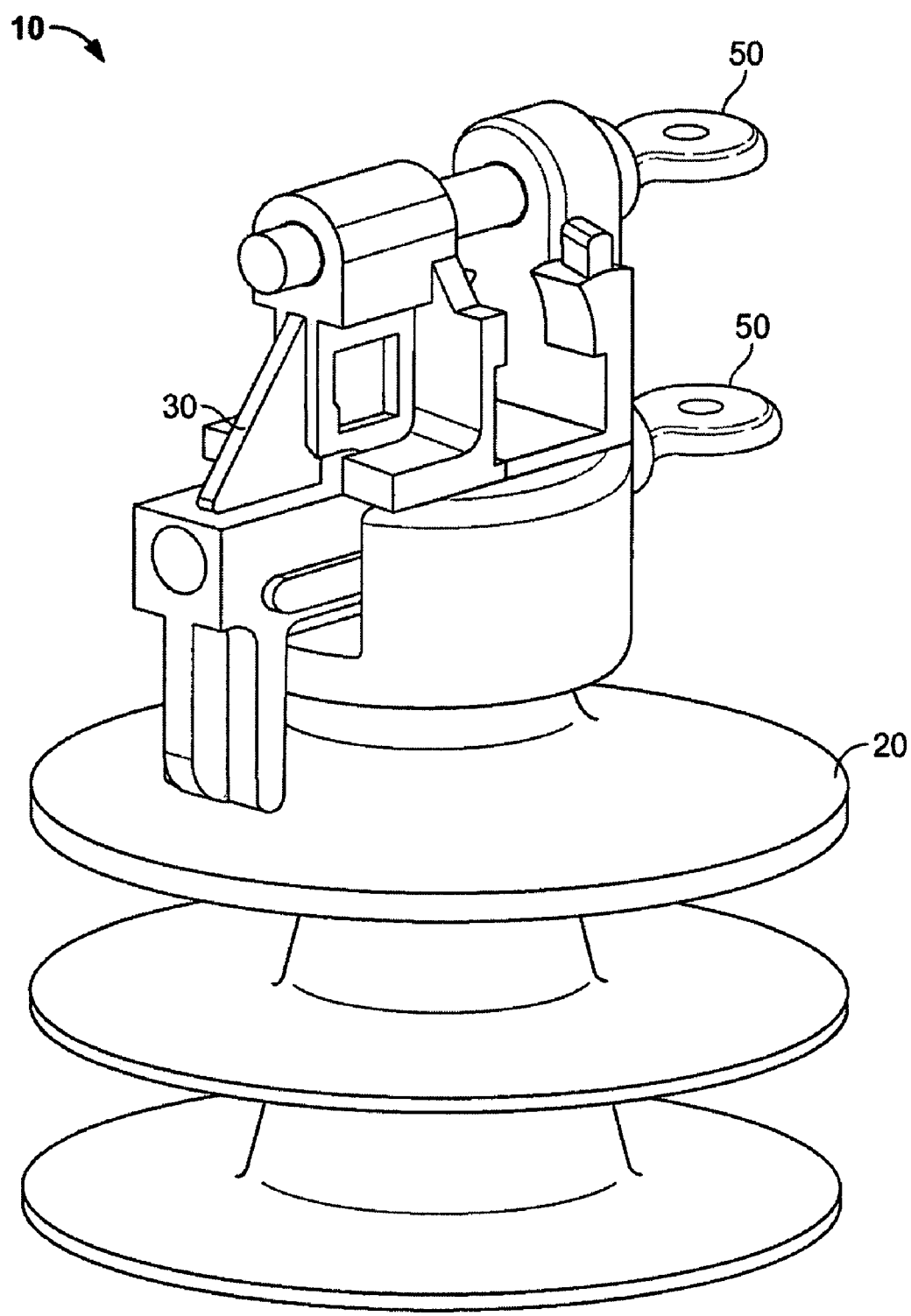
FIG. 1 is a perspective view of an insulator according to the invention.

The improved smart insulator according to the present invention will be described herein by reference to the accompanying drawings. Referring now to FIG. 1 the inventive smart insulator 10 is generally comprised of an insulator portion 20, as is known and used in the art, and a movable jaw assembly 30. The insulator portion 20 prevents phase to phase power line short circuits or phase to ground short circuits and is preferably of a high voltage polymer style of the 15, 25 or 35 Kv class of insulators, although other materials that are or may be used in the art, such as porcelain, may be used. The movable jaw assembly 30 secures the power line conductor (not shown) to the insulator. Mounting of the insulator on a supporting structure, such as a pole, is well documented in the art and apparent to those similarly skilled.

Figure 2:
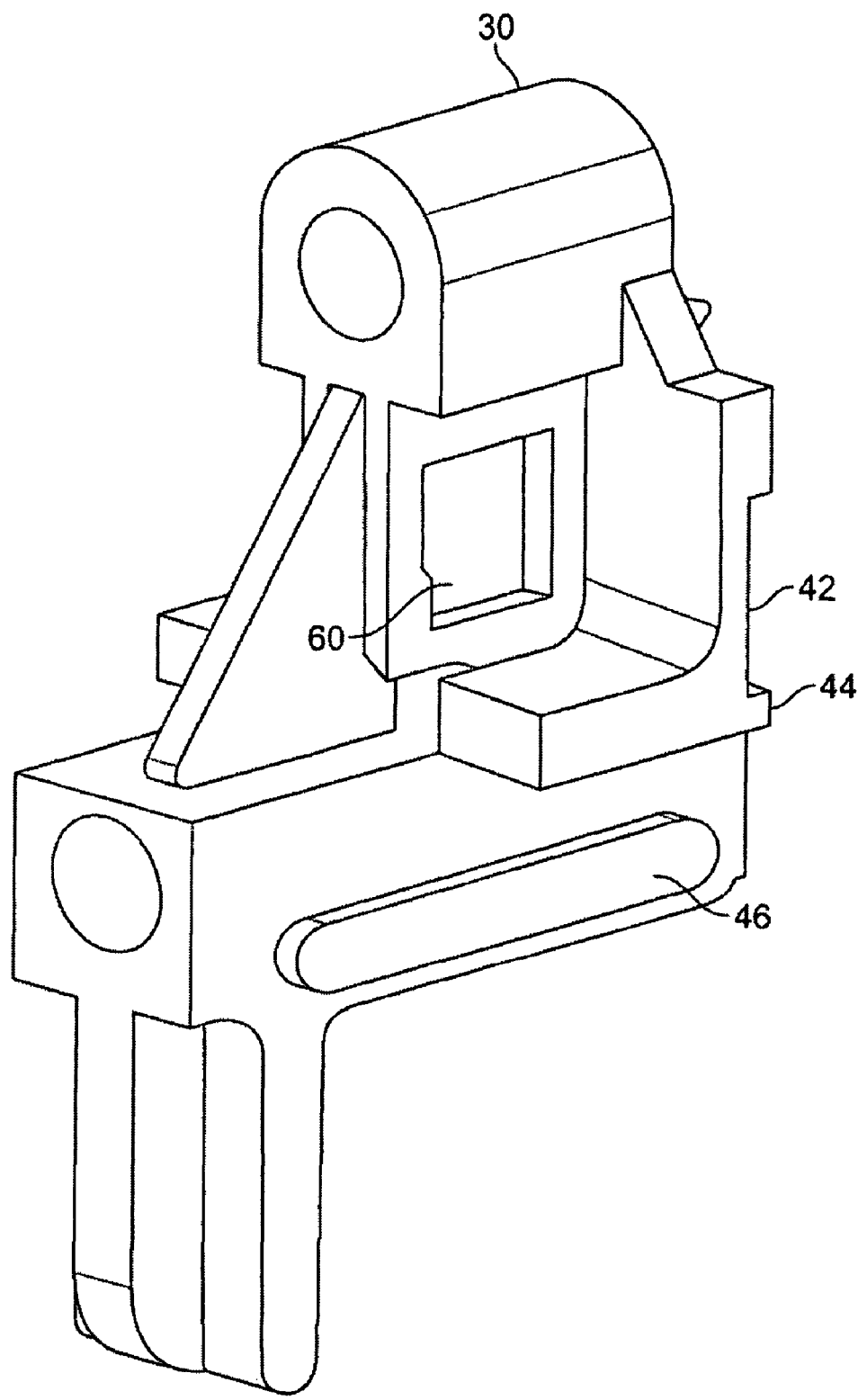
FIG. 2 is a perspective view of the movable jaw portion of the insulator according to the invention.

The movable jaw assembly 30 and insulator 20 are slideably engaged and secured by eye-bolts 50, the rotation of which opens and closes the jaw assembly 30. FIG. 2 illustrates an isolated view of the movable jaw 30. Jaw portion 30 serves as the housing for the current sensor 42, conductor temperature sensor 44, antenna 46, and microcontroller unit ("MCU") 60, having an analog to digital converter 82. The jaw assembly 30 may also contain other ancillary parametric measurement equipment. These and other sensors may take the form of transducers.

Figure 3:
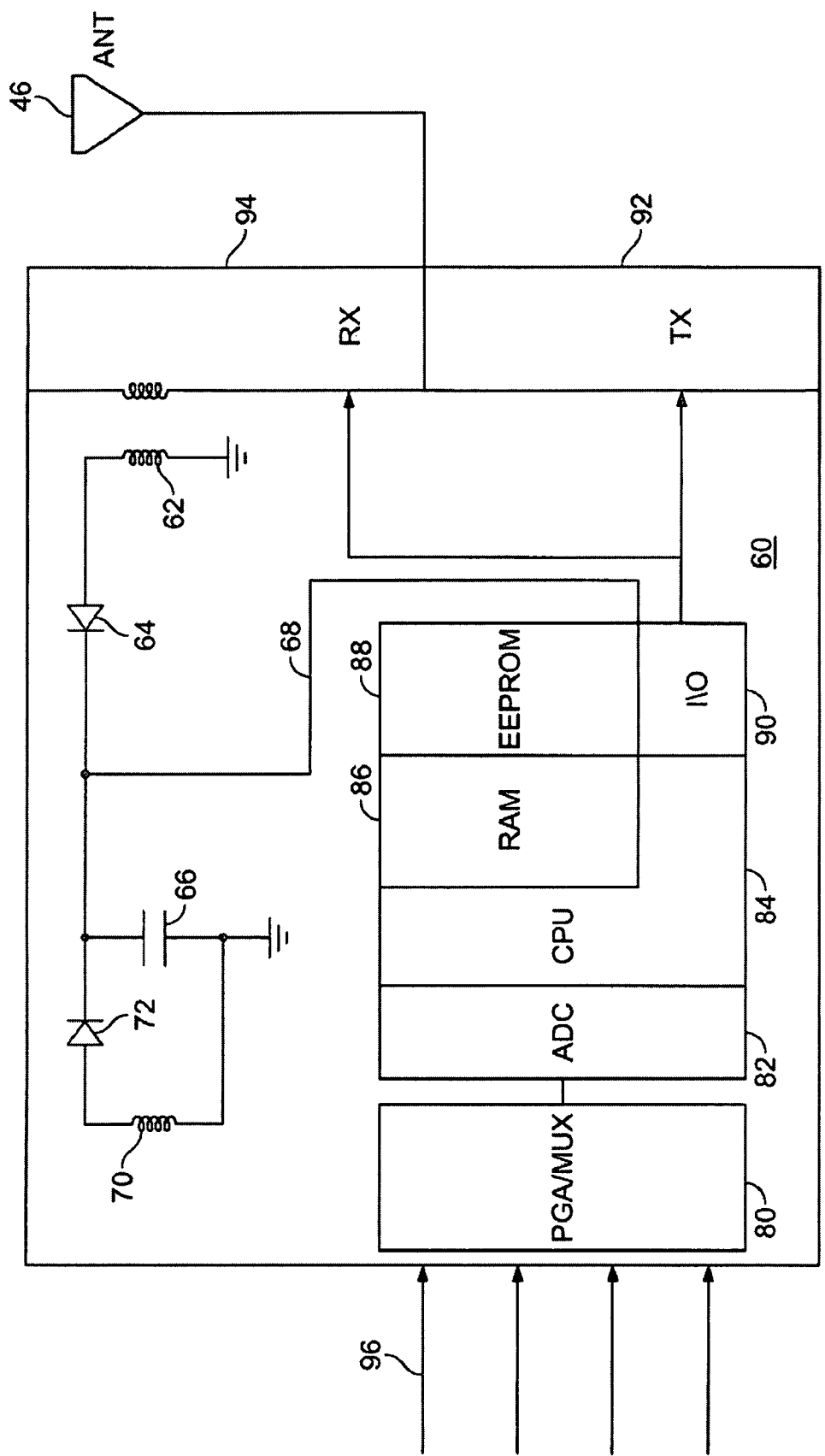
FIG. 3 is circuit block diagram illustrating the micro-controller unit according to the invention.

FIG. 3 schematically illustrates microcontroller unit 60 coupled to antenna 46. As is described in further detail, below, radio frequency ("rf") energy is received by antenna 46 is coupled through transformer 62 and rectified by diode 64 to charge super capacitor (super cap) 66. Power is coupled electrically 68 to the specific elements of microcontroller 60 (as further detailed herein). Microcontroller unit 60 can be preferably operated through energy received from the power line. Power line energy is picked up by coil 70 and rectified by diode 72, charging super cap 66. In this preferred embodiment, normal power is supplied by the power line through coil

70. When no line power is available to the MCU 60, the super cap 66 allows normal operations (namely receipt and storage of data) until the super cap loses its stored energy. As is contemplated as part of the described invention and described above, the super cap 66 can be charged by received rf energy transmitted by a remote data collection device that allows the MCU 60 to be queried for data, particularly for event data that may be related to line power loss.

The microcontroller unit 60 has several associated sub-units, namely a programmable gain element ("PGA") 80, an analog to digital converter ("ADC") 82, a central processing unit ("CPU") 84, random access memory ("RAM") 86, electronically alterable programmable read only memory ("EE-PROM") 88, an input/output section 90, a transmitting element or means (TX) 92 and a receiver element or means (RX) 94. Analog sensor inputs 96 (four are shown here) are signal conditioned by the PGA 80 and digitized by the ADC 82, such that the digitized data represents a scaled value of the magnitude of the inputs. In the preferred embodiment of the invention, analog sensor inputs 96 are voltage field sensors, current sensors (such as sensor 42), temperature sensors (such as sensor 44) and strain sensors. The recitation of such specific sensor types is not meant to limit the invention as other sensor types known in the art may used. Once the CPU 84 stores the received data in RAM 86, the values as compared at a periodic rate to determine if the data falls outside of the stored data values in the EEPROM 88, such that an alarm condition may occur. It is contemplated, and in fact preferred, that the CPU have a real time clock and calendar, or be electrically connected the same, to time and date stamp relevant event data. It should also be noted that data for voltage and current are preferably sampled at a rate that permits 32 samples of each cycle of the AC voltage and AC current, thus permitting a representation of the waveform of the AC current and voltage.

When a remote radio frequency command or query is detected by the receiver element 94 (by way of antenna 46), it is decoded by the CPU 84 and, depending on the command value, will initiate one of a set of actions. One possible result is that the CPU 84 will transmit internal data stored in RAM 86 via the transmitter element 92 for receipt by a remote receiver or to another inventive smart insulator 10. In this instance, another command value received by the receiver element 94 initiates a transfer of data and commands from one smart insulator to another such that peer-to-peer communications are permitted. Each inventive insulator 10 has stored in EEPROM 88 a unique identifier such that data on one or more insulator can be passed backward or forward from one insulator to another and, consequently, through a contiguous chain of insulators. One advantage of this ability to pass information from one insulator to the next is that line/insulator status at a particular insulator can be obtained at a base office or other remote location, rather than having access the insulator at its actual location. Similarly, it is also contemplated that the inventive smart insulator 10 may also send commands to a receiver connected to a high voltage power line switch which would perform the function of switching a power factor correcting capacitor or capacitors on single or multiple phases of the power grid for the purpose of supporting the line power factor or power line voltage improvement.

Data, such as the parameters of the fault and the command value will be preferably stored in non-static memory in addition to possible transmission.

Those skilled in the art will notice that the technology of the inventive smart insulator is related to radio frequency identification or RFID technology, but contains important differences. As such, a brief overview of the current state of RFID technology is warranted.

RFID systems are generally not new technology, having its origins in the anti-theft/theft prevention and inventory tracking and access control. Originally, such technology was based on electromagnetic (EM) field detection. Detection based on EM fields was limited to only a view inches with no data read-back capability. Such tags were also passive in that they did not have any active circuitry and no battery depletion issues to consider. Next, the technology moved to RFID systems. The user benefit was still passive, but had up to 42 inch read differences. Present technology RFID tags fall into two categories—passive smart tags and active smart tags.

Passive smart (PS) RFID tags incorporate a microchip with onboard storage capability of up to 64 bits for write once, ready many operations and are programmed at the time of use. The PS tags have the advantage of battery-less use as the tag will "wake-up" and respond only when queried by a reader. The RF energy contained in the wake-up query (or ping) supplies the tag with just enough power to send data back. Read distances are still fairly low—around 10 meters.

Active smart (AS) RFID tags differ from PS tags in that they contain a battery to maintain microchip data integrity, have a read range of about 85 meters, the data is read/write and can be up to 256 k bits. The use of a battery and associated issues (5 year lifespan, heat and cold), limit the use of AS tags to applications such as monitoring movement of high value assets, secure access control, and employee badge identification.

As can be appreciated, the technology of the instant invention offers distinct advantages of over current PS and AS RFID technology including, but not limited to, wireless commutation ability between the respective devices, the ability to operate on multiple power sources, the ability to provide a greater than instant charge to the device, and the ability to continually write data to the device during use.

The technology disclosed herein is not confined solely to the previously recited uses within an insulator. For example, the inventive technology can be used for:

Power outage reporting/monitoring.
Telephone/cable line reporting and monitoring.
Multi-phase capacitor controls.
Fault sensing and automatic sectionalizing power-line switches, including isolating a portion or section of a power line or grid to isolate an area with a fault such that power may be restored to the section before the faulted portion, and the faulted portion isolated and disconnected in an automated fashion.
SCADA (Supervisory Control and Data Acquisition) peer to peer monitoring points.
Micro weather alert stations (storm/lightning warnings).
DOT roadside monitors/alert stations.
Traffic control and monitoring.
Wireless line-post current sensors.

It also contemplated and expected that other components in the electrical transmission grid, such as capacitor controls, switches, spacers URD elbows, and streetlight controls, can use such technology and, as such, the disclosed invention is not limited to use in insulators only in the electrical transmission field. It is further contemplated that many of the aspects of the disclosed invention, such as use of rf energy to charge the super capacitor and the use of wireless communications between smart devices, have applications outside of the electrical transmission field.

In summary, the inventive smart insulator has the many advantages over the prior art including, but not limited to:

1. Prior art insulators, particularly those for 15, 25 and 35 Kv, have not had embedded micro-controller based data collection monitoring capabilities, let alone with the ability to operate with power line or battery energy;
2. Insulators have not had wireless communications capabilities;
3. Insulators have not had self-checking capabilities;
4. Insulators have not functioned as faulted circuit monitors;
5. Faulted circuit indicators have not recorded the fault current and normal current magnitudes nor the fault or voltage waveform for later remote retrieval via wireless communications; and
6. Prior insulators and fault circuit indicators have not had the ability to wirelessly communicate data from one insulator to another or through a chain of such insulators to a monitoring location.

In addition to the structures, sequences, and uses immediately described above, it will be apparent to those skilled in the art that other modifications and variations can be made the method of the instant invention without diverging from the scope, spirit, or teaching of the invention. Therefore, it is the intention of the inventor that the description of instant invention should be considered illustrative and the invention is to be limited only as specified in the claims and equivalents thereto.

I claim:

1. A method of monitoring parametric data in a power distribution network, the method comprising:
   a) providing at least one remote monitoring node including at least one programmable radio frequency identification (RFID) device, the remote monitoring node comprising an insulator portion and a jaw portion that houses the at least one programmable radio frequency identification (RFID) device;
   providing at least one high voltage insulator coupled to said electrical conductor, said insulator comprising an insulator portion and a jaw portion, said jaw portion including a microcontroller, an antenna coupled to said microcontroller, and at least one sensor coupled to a microcontroller
   b) obtaining parametric data from said power distribution network;
   c) inputting said parametric data into the at least one monitoring node;
   d) storing said parametric data on the at least one programmable RFID device;
   e) querying said at least one programmable RFID device for said parametric data.

2. The method of claim 1 further comprising the step of comparing said parametric data to a preset baseline data and generating a fault indicator status condition of said parametric data falls outside said preset baseline data, storing said fault indicator status condition on the at least one programmable RFID device and querying said at least one programmable RFID device for said parametric data and fault indictor status condition.

3. The method of claim 2 wherein the step of querying said parametric data and said fault indictor status comprises transmitting said data and indicator status from said RFID to an external receiver.

4. The method of claim 1 further comprising the steps of
   a) providing at least one analog sensor on said remote monitoring node for obtaining parametric data; and
   b) comparing any parametric data gathered by any of the at least one analog sensors to baseline data to provide an indication of an out of range fault.

5. The method of claim 4 whereby said baseline data is stored in computer memory.

6. The method of claim 1 wherein said parametric data includes data selected from the group consisting of tampering, intrusion and alarming conditions.

7. The method of claim 4, wherein the at least one analog sensor is selected from the group consisting of voltage field sensors, current sensors, temperature sensors, and strain sensors.

8. The method of claim 7, wherein the parametric data comprises a waveform representation of AC current or voltage.

9. The method of claim 1, wherein the step of storing includes providing a time and date stamp to the parametric data.

* * * * *